United States Patent
Kondo et al.

(10) Patent No.: US 6,376,401 B1
(45) Date of Patent: Apr. 23, 2002

(54) ULTRAVIOLET RAY-TRANSPARENT OPTICAL GLASS MATERIAL AND METHOD OF PRODUCING SAME

(75) Inventors: Shinichi Kondo; Takayuki Nakamura, both of Tokuyama; Kazuhiko Fukuda, Shinnanyo; Naoyoshi Kamisugi, Tokuyama; Nobu Kuzuu, Fukui; Yoshinao Ihara, Shinnanyo; Hidetoshi Wakamatsu, Yamaguchi-ken, all of (JP)

(73) Assignees: Tosoh Corporation, Yamaguchi-ken; Nippon Silica Glass Co., Ltd., Yamagata; Yamaguchi Nippon Silica Glass Co., Ltd., Yamaguchi, all of (JP)

( * ) Notice: Subject to any disclaimer, the term of this patent is extended or adjusted under 35 U.S.C. 154(b) by 0 days.

(21) Appl. No.: 09/387,773

(22) Filed: Sep. 1, 1999

(30) Foreign Application Priority Data

| Sep. 7, 1998 | (JP) | ............ | 10-252183 |
| Jan. 21, 1999 | (JP) | ............ | 11-012784 |
| May 21, 1999 | (JP) | ............ | 11-142231 |

(51) Int. Cl.⁷ ............ C03B 20/00; C03B 8/04; C03C 3/06
(52) U.S. Cl. ............ 501/54; 65/17.4; 65/414; 65/421
(58) Field of Search ............ 501/54; 65/17.4, 65/17.6, 32.1, 414, 421

(56) References Cited

U.S. PATENT DOCUMENTS

| 5,086,352 A | * | 2/1992 | Yamagata et al. ........... 359/350 |
| 5,330,941 A | * | 7/1994 | Yaba et al. .................. 501/54 |
| 5,364,433 A | * | 11/1994 | Nishimura et al. .......... 65/17.4 |
| 5,597,395 A | * | 1/1997 | Bocko et al. ................ 65/33.4 |
| 6,143,676 A | * | 11/2000 | Ohashi et al. ................ 501/54 |

FOREIGN PATENT DOCUMENTS

| EP | 0322881 A2 | 7/1989 |
| EP | 0385753 A2 | 9/1990 |
| EP | 0711736 A1 | 5/1996 |
| JP | A-1-176243 | 7/1989 |
| JP | A-4-97922 | 3/1992 |
| JP | A-5-139775 | 6/1993 |
| JP | 06-127960 | * 5/1994 |
| JP | 07215735 A | 8/1995 |
| JP | 11-228160 | * 8/1999 |
| WO | 98/52879 | * 11/1998 |

* cited by examiner

Primary Examiner—Sean E Vincent
(74) Attorney, Agent, or Firm—Nixon & Vanderhye

(57) ABSTRACT

A synthetic silica glass having a high transmittance for vacuum ultraviolet rays, for example $F_2$ excimer laser beam with a wavelength of 157 nm, a high uniformity and a high durability and useful for ultraviolet ray-transparent optical glass materials is produced from a high-purity silicon compound, for example silicon tetrachloride, by heat treating an accumulated porous silica material at a temperature not high enough to convert the porous silica material to a transparent silica glass in an inert gas atmosphere for a time sufficient to cause the OH groups to be condensed and removed from the glass, and exhibits substantially no content of impurities other than OH group a difference between highest and lowest fictional temperatures of 50° C. or less and a transmittance of 157 nm ultraviolet rays through a 10 mm optical path of 60% or more, and optically a OH group content of 1 to 70 ppm, a Cl content less than 1 ppm, a total content of impurity metals of 50 ppb or less, a content of each individual impurity metal less than 10 ppb, and an ultraviolet ray-transmittance at 172 to 200 nm of 40% or more even after the glass is exposed to an irradiation of ultraviolet rays at 160 to 300 nm for one hour.

21 Claims, 2 Drawing Sheets

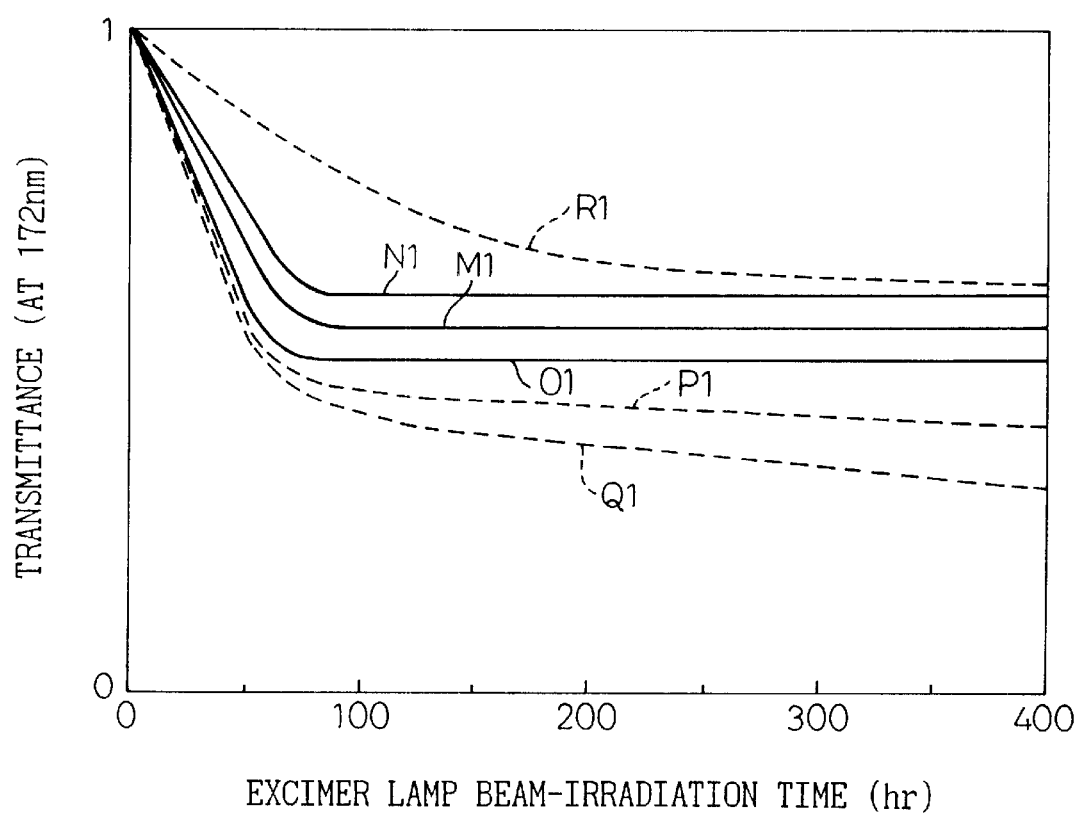

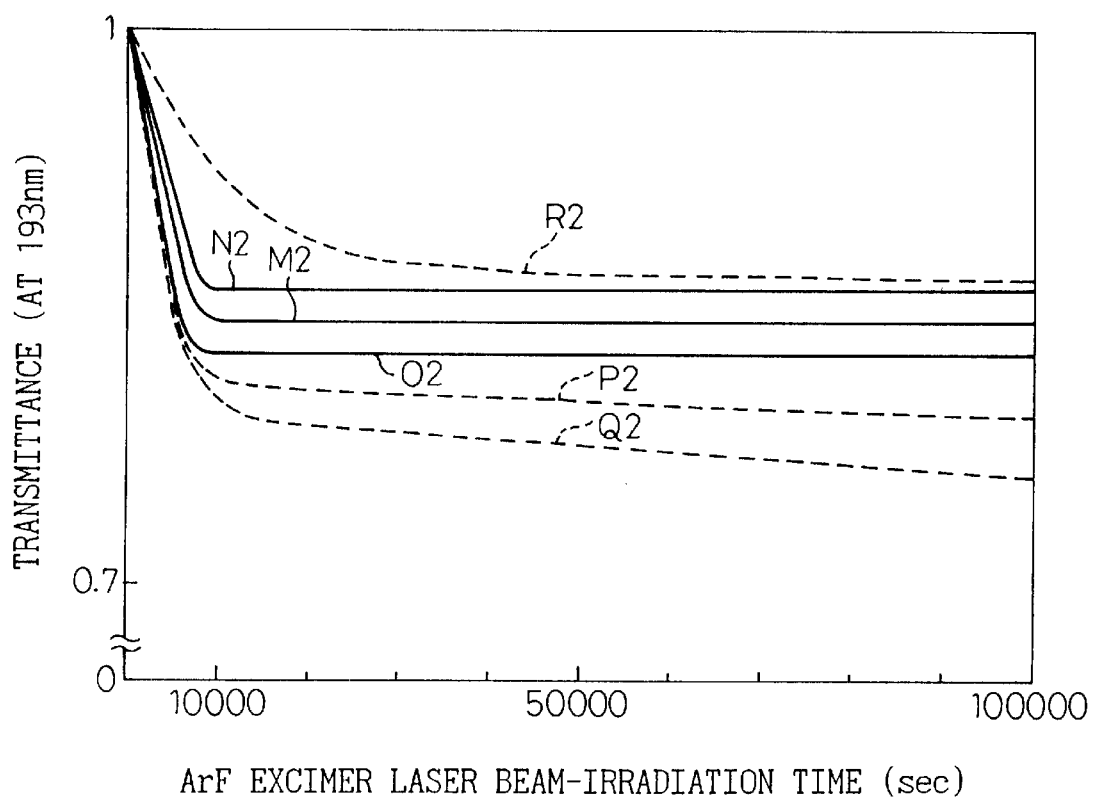

ULTRAVIOLET RAY-TRANSPARENT OPTICAL GLASS MATERIAL AND METHOD OF PRODUCING SAME

BACKGROUND OF THE INVENTION (1) Field of the Invention

The present invention relates to an ultraviolet ray-transparent optical glass material comprising a transparent silica glass and usable for lithography, optical CVD and optical cleaning using an irradiation source for ultraviolet rays in a wavelength range of about 160 to 300 nm, and a method of producing the same. More particularly, the present invention relates to an ultraviolet ray-transparent optical glass material comprising a transparent silica glass usable for lenses, photomasks for super LSI, prisms, window materials and lamp materials which must have a high transmittance for radiations from excimer lasers and excimer lamps in the vacuum ultraviolet ray band and the ultraviolet ray region and, especially, a transparent silica glass useful for $F_2$ excimer laser beam having a wavelength of 157 nm, and a method of producing the same.

(2) Description of the Prior Art

Conventional silica glasses have certain advantageous properties and certain disadvantageous properties and thus are used after consideration of the purpose. For example, for the optical materials for KrF laser beam having a wavelength of 248 nm or ArF excimer laser beam having a wavelength of 193 nm, usually a high purity synthetic silica glass having a significantly high content of OH groups or treated by a hydrogen treatment is employed, as disclosed in Japanese Unexamined Patent Publication No. 4-97922. In this type of synthetic silica glass, the resistance of the glass to a laser beam is enhanced by increasing the content of SiOH groups to make the glass network structure soft. Namely, to prevent generation of defects due to formation of precursory defective structures and a breakage of strained Si—O—Si bonds, the number of the strained bonds must be made small. Thus, in the above-mentioned silica glass, to decrease the strained bond content, the strain of the skeleton structure of $SiO_2$ should be decreased to prevent the formation of the defective structures, by increasing the content of Si—OH groups. In the prior art, the glass for ArF excimer laser beam was produced while preventing the formation of the above-mentioned unstable molecules, and was employed in practice. However, it is known that the transmitting property of the silica glass for vacuum ultraviolet rays is increased with a decrease in the content of OH groups in the silica glass and, when the glass is used for the vacuum ultraviolet rays, which will be referred to as VUV hereinafter, having a relatively short wavelength, the light absorption of the glass due to the OH groups hinders the transmission of the above-mentioned ultraviolet rays through the glass, and as a result, the silica glass having a high content of the OH group is not suitable as an optical material for an $Xe_{2*}$excimer lamp beam having a wavelength of 172 nm and an $F_2$ excimer laser beam having a wavelength of 157 nm. In a preferable method other than the above-mentioned method in which the OH group content is made high to prevent the breakage of the skeleton structures, the silica glass is subjected to a hydrogen treatment to cause hydrogen to be dissolved in the silica glass. This method is considered preferable.

However, this method exhibits several problems. Namely, the resultant silica glass has a disadvantage in its low durability after releasing hydrogen ($H_2$). Also, since the hydrogen reacts with the skeleton structure of the silica glass to produce≡Si—H groups and HO—Si≡groups, when the silica glass is used over a long period, the durability of the glass is significantly decreased. Further, when the silica glass is used as a tube material for a lamp, hydrogen $H_2$ and water $H_2O$ are discharged from the glass into the tube, to cause defective structures to be formed in the silica glass. Therefore, the light transmittance of the glass decreases and the light intensity of the lamp decreases.

A still another method, in which a silica glass is doped with fluorine to provide an optical silica glass material for VUV, has been proposed. When fluorine is doped in a sufficient large amount in the silica glass, not only does the resultant doped glass exhibits an enhanced resistance to ultraviolet rays, similar to that of the silica glass containing a large amount of OH groups, but it also exhibits no shift of the absorption end of vacuum ultraviolet ray transmittance, due to the OH groups, to a longer wavelength side, and thus a silica glass material having excellent vacuum ultraviolet ray-transmission property can be obtained. To impart a sufficient high resistance to excimer laser beam to the glass by the above-mentioned method, the glass must be doped with fluorine in an amount of several hundreds ppm or more. However, since the doped fluorine causes the refractive index of the silica glass to be reduced, a distribution of the refractive index occurs and strial are generated.

An optical ununiformity such as strial cannot be removed by a heat treatment or a melt-drawing or expansion. Also, when the fluorine-doped silica glass is heat-treated, the resultant silica glass exhibits absorption bands at 7.6 eV and 5.0 eV. For example, if the fluorine-doped glass is used as an optical material for an excimer laser beam, a portion of the doped fluorine is released from the glass due to the irradiation of the laser beam, and is emitted as $F_2$ which has a high etching property, from the surface of the glass, and the optical device is affected by the emitted fluorine. For the above-mentioned reasons, the fluorine-doped silica glass is not suitable for a vacuum ultraviolet ray-transparent optical material such as a stepper projection lens which has a large aperture and must have a high uniformity.

Therefore, when the content of the OH group in the silica glass is reduced, although the transmission, in the resultant glass, of the vacuum ultraviolet rays is enhanced, the transmittance of the glass to the vacuum ultraviolet rays significantly falls with a lapse of ultraviolet ray-irradiation time. As mentioned above, when the transmittance falls with the irradiation time, not only the absolute value of the reduced transmittance but, also, the stability in the ultraviolet ray transmittance of the glass must be considered. For example, when the silica glass is used as a window material or a collective lens for a light CVD using a excimer lamp with a wavelength of 172 nm and for ultraviolet ray dry-cleaning, and ultraviolet rays, particularly VUV rays with a wavelength of less than 200 nm, are continuously irradiated to the glass for a long period, defects are usually gradually generated in the glass, and the ultraviolet ray transmittance of the glass falls in proportion to the irradiation time.

In view of the above-mentioned phenomena, a synthetic silica glass which has a low OH group content, contains no ultraviolet ray-absorbing defective structures and no precursory structures of the defective structures, and exhibits a high resistance to generation of defective structures and precursory defective structures even when the glass is continuously exposed to a heat treatment or a VUV ray-irradiation for a long period, is considered as a glass exhibiting an excellent ultraviolet ray-transmittance. However, an ultraviolet ray-transparent optical glass material comprising the above-mentioned type of synthetic silica glass has not yet been provided in practice.

SUMMARY OF THE INVENTION

An object of the present invention is to provide an ultraviolet ray-transmissible optical glass material comprising a synthetic silica glass which has a high transmittance of ultraviolet rays, particularly at a wavelength of 157 nm which is a lasing wavelength of $F_2$ excimer laser, which glass is an optically stable substance free from change in composition and in light transmission, and which glass does not exhibit an increased light absorption or a reduced uniformity even after a heat treatment at a high temperature or VUV ray irradiation is continuously applied to the glass over a long time, and a method of producing the ultraviolet ray-transparent optical glass material.

The above-mentioned object can be attained by the ultraviolet ray-transparent optical glass material and the method of producing the same, of the present invention.

The ultraviolet ray-transparent optical glass material of the present invention comprises a synthetic silica glass produced from a silicon compound having a high degree of purity by a soot method in which the silicon compound is flame-hydrolyzed, the resultant soots are accumulated to form a porous silica preform body and the porous silica preform body is converted to a transparent glass by heating, containing substantially no impurity other than hydroxyl group, and having a difference between highest and lowest fictive temperatures of the glass of 50° C. or less, and a transmittance of ultraviolet rays at a wavelength of 157 nm through an optical path having a length of 10 mm of 60% or more.

Also, the method of the present invention for producing the ultraviolet ray-transparent optical glass material defined above comprises firstly heat-treating a porous silica preform body produced in the soot method, at a temperature which does not cause the porous silica preform body to be transparent; and secondly heat-treating the first heat-treated porous silica preform body at a temperature which is higher than the first heat-treatment temperature and causes the first heat-treated porous silica preform body to be transparent.

BRIEF DESCRIPTION OF THE DRAWINGS

FIG. 1 is a graph showing a changes in excimer beam-transmittance of glasses samples M to R with changes in excimer beam-irradiation time of an excimer lamp, and FIG. 2 is a graph showing a changes in ArF excimer laser beam-transmittance of glass samples M to R with the number of ArF excimer laser beam shots.

DESCRIPTION OF THE PREFERRED EMBODIMENTS

The inventors of the present invention extensively studied various methods for producing ultraviolet ray-transparent optical glass material having a high stability in practical use. As a result, the inventors found that, in a method of producing a synthetic silica glass by hydrolyzing silica tetrachloride in an oxygen/hydrogen flame to prepare a porous silica preform material (soots), by heat-treating the soots at a relatively low temperature of 1100 to 1450° C., and then by sintering the heat-treated soots at a high temperature to convert the soots to a glass, which method will be referred to as a soot method hereinafter, when the soots, namely a porous silica preform material is made dense in a sufficient long time before sintering and making transparent the heat-treated soots, and then is gradually made transparent, the resultant silica glass exhibits a reduced distribution of the frictive temperature, which will be represented by TF hereinafter), of the glass, which distribution of the frictive temperature will be represented by $\Delta T_F$ hereinafter, and as a result, a stable ultraviolet ray-transparent optical glass material having a high ultraviolet ray-transmittance at a wavelength of 157 nm is obtained. By the above-mentioned method, an ultraviolet ray-transparent optical glass material comprising a synthetic silica glass having a $\Delta F_F$ of 50° C. or less, a OH group content of 30 to 40 ppm, a Cl content of 1 ppm or less, a total content of impurity metals, for example, alkali metals, alkaline earth metals, transition metals and others, of 50 ppb or less, a content of each individual impurity metal of less than 10 ppb, and a transmittance of ultraviolet rays at a wavelength of 157 nm through an optical path having a length of 10 mm of 50% or more, can be obtained.

In the above-mentioned production method, by controlling particularly the heat treatment conditions, a synthetic silica glass having a transmittance of ultraviolet rays at a wavelength of 157 nm through an optical path having a length of 10 mm of 60% or more can be obtained.

When the synthetic silica glass is used as an optical glass material for ultraviolet rays, the silica glass must not exhibit an increased absorption of ultraviolet rays even after having been irradiated with the ultraviolet rays for a long time. It is known that ≡Si· structure generated in the silica glass by the irradiation of ultraviolet rays theretoward and referred to as an E' center causes an absorption band having an absorption peak at a wavelength of 215 nm to be generated in the silica glass. Further it is known that oxygen hole structure ≡Si . . . Si≡ having an absorption peak at a wavelength of 245 nm and hydrogen-related E' center, which is referred to as an Eβ' center, having an absorption peak at a wavelength of 230 nm cause absorption bands to be generated in the silica glass. When precursory structures for the above-mentioned defective structures are present in a material for producing optical materials, and the material is exposed to an irradiation of ultraviolet rays, the ultraviolet ray-absorption bands are generated in the material.

As another cause of the generation of the ultraviolet ray-absorption bands, a defective structure formed by breakage of strained Si—O—Si bonds is known. For example, when the strained ≡Si—O—Si≡ structures are present in the silicon glass, the structures are broken as shown below,

$$\equiv\text{Si—O—Si}\equiv \rightarrow \equiv\text{Si} \ldots \text{Si}\equiv \qquad (1)$$

and defective structures are formed in the silica glass. In this case, ≡Si—O· structures are generated together with the E' centers in the silica glass and are referred to as non-bondable oxygen hole centers (NBOHC). The ≡Si—O· structure causes the visible light-and ultraviolet ray-absorption band having absorption peaks at wavelengths of 625 nm and 260 nm to be generated.

The inventors of the present invention consider that ultraviolet ray-absorption bands are generated by the precursory defective structures ≡Si—H and H—O—Si≡. It is supposed that the precursory defective structures are formed by reaction of the strained Si—O—Si bond with hydrogen gas during the synthesis of the silica glass. When ultraviolet rays are irradiated toward the precursory defective structures, the E' centers are formed by the following reaction:

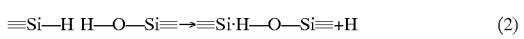

$$\equiv\text{Si—H H—O—Si}\equiv \rightarrow \equiv\text{Si·H—O—Si}\equiv + \text{H} \qquad (2)$$

To prevent the generation of the above mentioned precursory defective structures and the generation of the defective structures due the breakage of the strained Si—O—Si bonds, the content of the strained Si—O—Si bonds should be decreased. For this purpose, the present invention shows that the strain in the skeleton structure of $SiO_2$ can be reduced by increasing the content of Si—OH structures, and thus the generation of the defects can be prevented.

The hydroxyl (OH) groups exhibit an absorption in a certain band of vacuum ultraviolet rays and, thus, when a large amount of the hydroxyl groups are introduced into the silica glass to reduce the strain, the introduced hydroxyl groups cause the resultant silica glass to exhibit a reduced transmittance of vacuum ultraviolet rays. Accordingly, the inventors of the present invention have researched the synthetic silica glasses produced by various methods to discover what type of synthetic silica glass exhibit a high transmittance of ultraviolet rays, particularly $F_2$ excimer laser beam at a wavelength of 157 nm, a high resistance to degradation, a high resistance to change in structure due to heat treatment at a high temperature and a high durability when used as an optical glass material for lamps. The conclusion of the research is as follows.

(1) The vacuum ultraviolet-ray transmission property of the synthetic silica glass (OH group content: 80 ppm) prepared by a method (a soot method) in which a hydrolysis of silicon tetrachloride in an oxygen/hydrogen flame is carried out at a relatively low temperature, to produce a porous material comprising a plurality of fine silica particles; the porous silica material is sintered at a high temperature to convert the porous material to a glass, is more advantageous than that of a conventional synthetic silica glass (OH group content: 1200 ppm) produced by a direct method in which a hydrolysis product of silicon tetrachloride in oxygen/hydrogen flame is directly accumulated to form a synthetic silica glass.

(2) If the synthetic silica glass produced by the soot method is dehydrated by using chlorine (including chlorine-containing compound gas), the resultant glass having a OH group content of 1 ppm or less necessarily exhibits a lower vacuum ultraviolet-ray transmission property than that of a synthetic silica glass produced by the direct method and having a OH group content of 1200 ppm.

(3) A vacuum ultraviolet-ray transmission property of a synthetic silica glass which has been produced by the soot method and treated by a dehydration treatment with a reducing gas, without applying the chlorine treatment, and has a OH group content of 10 ppm or less, is lower than that of a synthetic silica glass produced by the soot method but not treated by the dehydration treatment, and having a OH group content of 80 ppm.

From the above-mentioned research results, the conclusion is as follows. First, there is a great difference in OH group content between the synthetic silica glasses produced by the soot method and the direct method. Since it is known that the OH groups have an absorption in ultraviolet ray range, it is considered that the difference in the OH group content directly causes a difference in the vacuum ultraviolet-ray transmission property between the silica glasses made by the soot method and by the direct method.

The reasons for the differences appeared between the silica glasses which were produced by the soot method were assumed to be as follows. The porous silica glass materials produced by the soot method has a small water content in percent order. However, after applying a sintering treatment to the porous silica glass materials, the resultant silica glasses have a very small content of water (OH group) in the ppm order. The reasons for the reduction in the water content are assumed as follows. Namely, during the sintering procedure of the silica glass, the OH groups located on the surfaces of the fine glass particles are associated with each other and the association products are removed in the form of water from the glass particle surfaces. In the sintering procedure, when a gas having a dehydration effect is present in the sintering atmosphere, the OH groups located on the glass particle surfaces are optionally replaced or removed, and thus the content of the OH groups are rapidly reduced within a short time.

It is assumed, however, that the replacement or removal of the OH groups from the silica glass causes structural defects or precursors of the defects to be generated in the glass structure and simultaneously, the Si—O—Si bonds from which the glass skeleton is formed are strained. When the Si—O—Si bonds are strained, the above-mentioned defects are generated and as a result, the VUV ray transmission property of the silica glass is degraded. The strain of the bonds is represented by $T_F$ and the difference in the bond strain is represented by $\Delta T_{F1}$. The $\Delta T_F$ represents a difference between highest $T_F$ value and the lowest $T_F$ value of the silica glass. $T_F$ is an indicator showing the structure of the glass, namely an bonding angle of Si—O—Si bonds, and is very variable in response to the heat history of the silica glass. The difference in $F_F$ is derived from the difference in $SiO_2$ structure from which the silica glass is formed, namely, from the difference in bonding angle of a regular tetrahedron formed from the $SiO_2$. The phenomenon that the distribution of $T_F$ is large, shows that the distribution of the bonding angle is large and that the strain in the bonds is large. Namely, the larger the $\Delta T_F$, the larger the content of the bonds having a low stability and the lower the stability of the Si—O—Si bonds, the larger the bond strain of Si—O—Si, and the larger the content of the precursory defects. Thus, by making $\Delta T_F$ small, the bond strain can be removed, and the generation of the precursory defects can be restricted, and the VUV transmission property of the silica glass can be enhanced.

To reduce the $\Delta T_F$, it is necessary that the porous silica preform glass material is heat treated for a long time sufficient to gradually sinter the preform glass material. The resultant silica glass having a low $\Delta T_F$ has a very small bond strain. In this gradual sintering, rapid replacement and removal of the OH groups are not effected. The dehydration is effected only by the condensation of the associated OH groups with each other, and by taking a long time for the condensation dehydration. The resultant silica glass has a very low OH group content. The resultant silica glass also exhibits an excellent VUV transmission property, includes a low content of defective structures and precursory defective structures, and has a high stability.

The VUV transmission property and stability of the silica glass are affected by chlorine (Cl) and impurity metals contained therein, in addition to the OH group content and the bond strain, namely $\Delta T_F$.

When Cl is contained, the resultant SiCl causes precursory defects to be formed in the glass and E' centers to be generated. Since SiCl has an absorption in the wavelength range of the vacuum ultraviolet rays, the content of Cl in the silica glass should be as low as possible. Preferably, the Cl content is 1 ppm or less.

The impurity metals cause an absorption band to be generated in the VUV wavelength range and generation of E' centers and other structural defects to be promoted. Therefore, the content of the impurity metals should be as low as possible. Particularly, the total content of the impurity metals is preferably limited to 50 ppb or less and the content of each individual impurity metal is preferably limited to less than 10 ppb.

A stable optical material preferably exhibits a high absolute value of transmittance and a low change in the transmittance with a lapse of time. However, in fact, a certain reduction in the transmittance may be unavoidable. Even in this case, if no change in the transmittance with time occurs, the material can be used as a stable optical material. For example, in case where an irradiation of ultraviolet rays is applied over a long time, when a reduction in transmittance occurs in the initial stage of the irradiation, and the reduction of the transmittance is stopped in the later stage of the irradiation so that the transmittance of the optical material can be stabilized, the optical material should be subjected to an irradiation of ultraviolet rays before processing it into an optical part, and then to practical use.

In the soot method, when the porous preform body is converted to a glass by fuse-bonding the soot surfaces, precursory defects are generated in the glass. The precursory defects are locally distributed in the soot surfaces, and thus the number of the defects generated in the glass is limited.

Thus, in the silica glass produced by the soot method, the amount of the defects generated by the irradiation of ultraviolet rays is limited. Therefore, after the silica glass is subjected to the irradiation of ultraviolet rays for a time long sufficient to saturate the generation of the defects, no new defect is generated. After the irradiation of ultraviolet rays, the resultant silica glass has a constant ultraviolet ray transmittance and exhibits no change in the transmittance with time. In this case, the wavelength of vacuum ultraviolet rays is preferably in the range of 165 to 300 nm, more preferably of 170 to 250 nm. When the wavelength is more than 300 nm, the ultraviolet ray irradiation time necessary for stabilizing the silica glass is too long to be practical. When the wavelength is less than 165 nm, even after the irradiation, new defects may be generated in the resultant silica glass. Preferably, the silica glass is directly subjected to the irradiation of ultraviolet rays having the same wavelength as that for which the silica glass is used. However, the ultraviolet ray irradiation may be carried out in an appropriate manner in consideration of the throughput of the treatment and the cost of the light source.

As a practical radiation source for transmittance-stabilization, for example, KrF and ArF excimer lasers and an $Xe_{2^*}$ excimer lamp and a mercury lamp can be used.

The present invention will be further explained below.

The glass-producing material may be selected from gasifiable silicon compounds having high degrees of purity. From the silicon compounds, the silica glass can be produced by the following steps.

(1) A glass-forming silicon compound is subjected to flame-hydrolysis and the resultant fine silica particles, namely, soots, are accumulated on a starting material to form a porous silica preform body.

(2) The porous silica preform body is heated at a temperature equal to or lower than the temperature at which the porous silica preform body becomes transparent in an appropriate gas atmosphere, and is maintained under the above-mentioned conditions for a certain time.

(3) The porous silica preform body heat treated in the above-mentioned step is made into a transparent glass to form a silica glass.

In step (2), by appropriately controlling the heat-treatment temperature and the heat-treatment time and/or the heat treatment atmosphere, the $\Delta T_F$ and the OH group content of the resultant silica glass can be adjusted as desired. For the control, a method in which the heat treatment is carried out in a nitrogen atmosphere for a very long time, and a method in which the heat treatment is carried out within a relatively short time, in a mixed gas of CO and $N_2$ in a certain mixing ratio, or a mixed gas of $H_2$ and $N_2$ in a certain mixing ratio, are known. The heat treatment method using the CO gas-containing atmosphere is advantageous in the heat treatment effect, and the heat-treatment method using the nitrogen gas atmosphere is advantageous in the easy in handling of the heat treatment gas. The heat-treatment time is variable in response to the size of the optical material. In case where the target glass material has the dimensions of about 3 cm×3 cm×3 cm, a heat-treatment time of about 3 hours is long enough for the glass material.

When the reducing gas is used, the reduction in the content of the OH groups is effectively promoted. However, the heat treatment needs a long time, and thus a low content of oxygen in the glass may cause defects to be generated in the resultant glass. For this reason, when the reducing gas is used the heat treating time is preferably limited to 32 hours or less.

The heat treating temperature is preferably 1100° C. to 1450° C. When the heat treating temperature is less than 1100° C., the prevention effect on the generation of defects on the soot surfaces by densifying of the soots is insufficient. When the heat-treatment temperature is more than 1450° C., the accumulated porous silica preform body is made transparent when the treatment is applied over a long time. When the above-mentioned heat-treatment is carried out at a temperature lower than 1300° C., the OH group-removing effect is not always satisfactory. Usually, by carrying out the heat treatment in a $CO/N_2$ mixed gas atmosphere in which the proportion of CO gas is increased, over a long time, the defective structures in the soots can be relaxed, while controlling the content of the OH groups. Thereafter, by applying the heat treatment step (3) at temperature of 1450 to 1600° C., a transparent silica glass in which the amount of the defects are maintained constant, for example, the defects generated by the irradiation of ultraviolet rays are saturated within a short time, and thereafter even when a continuous irradiation of ultraviolet rays is applied to the glass, no reduction in the transmittance of ultraviolet rays occurs, can be obtained.

Particularly, in the step (2), a heat treatment is carried out in a temperature range in which the porous silica preform body cannot be made transparent, namely in the range from 1200° C. to 1350° C., preferably from 1250° C. to 1350° C., for a time of 16 hours or more but not more than 216 hours, preferably 24 hours or more but not more than 144 hours at a highest temperature. Further preferably, to remove the unstable precursor defects generated on the surfaces and insides of the soots, and to uniformly prevent the defect-generation in the inside of the glass with a high efficiency, the heat treatment step (2) is continued for 32 hours or more but not more than 144 hours. When the time of the heat treatment step (2) is more than 216 hours, the porous silica preform body may be made transparent. Also, even when the heat treatment step (2) time is more than 144 hours, the heat treatment effect may be saturated, while the heat treatment effect may be variable in response to combination of the heat treatment time with the heating rate (temperature-rising rate).

As a heat treatment atmosphere for step (2), nitrogen gas, helium gas or a mixture of nitrogen or helium with an other inert gas. By using a reducing gas, although a reduction of the OH group content with an enhanced efficiency is expected, a long time heat treatment causes defects to be generated in the resultant glass and thus the time of the heat treatment in the reducing gas atmosphere is preferably restricted to 32 hours or less within the above-mentioned treatment time.

In the heat-treatment step, the heating rate up to the above-mentioned heat-treatment temperature is, preferably, in the range from room temperature to 500° C.; 100° C./hr or more but not more than 1500° C./hr, more preferably 100° C./hr or more but not more than 1000° C./hr, still more preferably 100° C./hr or more but not more than 500° C./hr, in the range from 500° C. to 1000° C., 50° C./hr or more but not more than 1000° C./hr, more preferably 50° C./hr or more but not more than 500° C./hr, still more preferably 50° C./hr or more but not more than 200° C./hr; in the range from 1000° C. to 1200° C., 5° C./hr or more but not more than 200° C./hr, more preferably 5° C./hr or more but not more than 100° C./hr, still more preferably 5° C./hr or more but not more than 50° C./hr; and in the range from 1200° C. to 1350° C., 1° C./hr or more but not more than 100° C./hr, more preferably 1° C./hr or more but not more than 50° C./hr, still more preferably 1° C./hr or more but not more than 40° C./hr. In the temperature-rising procedure in the range from 1000 to 1350° C., particularly from 1200° C. to 1350° C., the soots are exposed to a high temperature and the surfaces of the soots are sintered at a high rate, and thus it is advantageous that the temperature of the soots is very gradually increased at the above-mentioned heating rate.

In the heat treatment step (2), the average bulk density of the porous silica preform body is preferably adjusted to 1.4 g/cm$^3$ or more, more preferably 1.8 g/cm$^3$ or more, still more preferably 2.0 g/cm$^3$, the density distribution $\Delta\rho$ (a difference between the highest and lowest bulk densities) of the preform body in the radial direction to 0.4 g/cm$^3$ or less, more preferably 0.3 g/cm$^3$ or less, still more preferably 0.2 g/cm$^3$ or less.

In the transparent glass-forming step (3) succeeding the step (2), when the porous silica preform body treated by the heat treatment step (2) is heated to a transparent glass-forming temperature in the range from 1450° C. to 1550° C., the heating rate in the temperature range of 1000° C. or more is preferably controlled to 150° C./hr or less, more preferably 120° C./hr or less, still more preferably 100° C./hr or less.

In the resultant synthetic silica glass the $\Delta T_F$ is 50° C. or less, and the content of the OH groups dehydrated only by the mutual condensation of the OH groups associated in the roots, is 1 to 40 ppm, and the transmittance of ultraviolet rays having a wavelength of 157 nm through an optical path having a length of 10 mm is 60% or more. Namely, the synthetic silica glass produced by the method of the present invention exhibits the above-mentioned excellent properties. Also, in the synthetic silica glass of the present invention, the reduction in transmittance of ultraviolet rays having a wavelength of 157 nm due to an irradiation of $F_2$ excimer laser beam at 1×10$^6$ pulses is less than 1%; the difference in refractive index between before and after the irradiation, which difference is an indicator of compaction of the glass, is 1×10$^{-6}$ or less; and the change in the birefringence between before and after the irradiation is 1 nm/cm or less. The term "compaction" used for the silica glass refers to a change in refractive index and a change in plane, due to a density-increasing phenomenon of the glass derived by the ultraviolet excimer laser beam.

When the silica glass contains chlorine (Cl), the resultant SiCl serves as a precursor for defects and E' centers are generated. Also, since SiCl has an absorption in a wavelength region of 157 nm, the content of chlorine in the silica glass is preferably limited to less than 1 ppm, more preferably to substantially zero. Further, since the impurity metals directly cause the resultant glass to exhibit an ultraviolet ray-absorption and promote the generation of structural defects such as E' centers, the glass preferably contains substantially no impurity metals. In practice, preferably, the total content of the impurity metals is limited to 50 ppb or less, and the content of each individual impurity metal is limited to 10 ppb or less.

The resultant synthetic silica glass of the present invention is characterized by exhibiting excellent vacuum ultraviolet ray-transmittance and durability in the transmittance, which could not be obtained in the prior art, and a high stability in heat treatment, a high resistance to irradiation of radiations such as γ-rays, and a high uniformity.

With respect to the uniformity of the silica glass, the uniform refractive index distribution in which there is no difference between the outer portion and inner portion of the glass, is obtained by gradually heating the soots to the heat-treatment temperature over a sufficient long time. Also, the synthetic silica glass of the present invention exhibits a high uniformity represented by a low differential refractive index An of 2×10$^{-6}$ or less determined in a circular region having a diameter $\phi$ of 200 mm.

Also, the silica glass of the present invention has a high viscosity, similar to that of a melt silica glass, and thus is usable for many uses such as, for example, structural materials for producing semi-conductors, in addition to use as an optical material.

EXAMPLES

The present invention will be further illustrated by the following examples which are merely representative and do not limit the scope of the present invention in any way.

Example 1

Silicon tetrachloride, which had been refined, was subjected to a flame hydrolysis, and the resultant soots were accumulated to provide a porous silica preform body having a diameter of 400 mm and a length of 1,000 mm. The porous silica preform body was subjected to a heat treatment at a temperature of 1300° C. in a nitrogen gas atmosphere in a furnace core tube equipped in a uniformly heating type electric furnace. The core tube temperature was raised in a temperature range from room temperature to 500° C. at a heating rate of 500° C./hr, in the temperature range from 500° C. to 1000° C., at a heating rate of 100° C./hr, in the temperature range from 1,000° C. to 1200° C. at a heating rate of 10° C./hr, and in the temperature range from 1200° C. to 1300° C. at a heating rate of 5° C./hr, and maintained at the heat treatment temperature of 1300° C. for a time of 32 hours. The heat-treated porous silica preform body had an average bulk density of 2.10 g/cm$^3$.

The heat-treated porous silica preform body has placed in a furnace core tube equipped in a zone-heating type electric furnace; and heated to a temperature of 1500° C. at a heating rate of 100° C./hr in a helium gas atmosphere to convert the porous silica preform body to a transparent silica glass.

A sample taken from the resultant silica glass was dissolved in an aqueous 38% formic acid and subjected to a quantitative analysis for chlorine. It was confirmed that the chlorine content of the silica glass was less than 1 ppm which is a lower limit for chlorine detection. Also, the contents of the impurity metals contained in the silica glass were measured by a quantitative analysis using an ICP mass spectrometer. As a result, it was confirmed that the total content of the impurity metals including alkali metals, alkaline earth metals, transition metals and others was less than 50 ppb and the content of each individual impurity metal was less than 10 ppb.

The uniformity of the resultant silica glass represented by Δn was $1.0 \times 10^{-6}$ as determined in a circular region having a diameter φ of 200 mm and in the radial direction of the glass. From a center portion in the radial direction of the resultant glass and an outer portion of the glass located 100 mm away from the center, two specimens having dimensions of 10 mm×10 mm×30 mm were cut, and two faces of each specimen opposite to each other were optically polished. A specimen A1 taken from the center portion and a specimen A2 taken from the outer portion of the glass were prepared.

In each of the specimens A and B, the content of OH groups was determined from intensity of absorption at a wavelength of 2.73 μm measured by an infrared spectrometer. As a result, the OH group content was 40 ppm in the specimen A1 and 30 ppm in the specimen A2. The specimens A1 and A2 were subjected to a fictive temperature determination from the position of an absorption peak at 1120 cm$^{-1}$ in infrared spectrum. The difference $\Delta T_F$ between highest and lowest frictive temperatures of the specimens A1 and A2 was 10° C.

When an $F_2$ excimer laser beam having a wavelength of 157 nm was irradiated at an energy density of 10 mJ/cm$^2$·pulse at a periodic frequency of 1,000 Hz to the optically polished face of the specimen A1, the transmittance of the laser beam through an optical path having a length of 10 mm was 65%. After the laser beam was irradiated at 1×10$^6$ pulses, a reduction in the transmittance of the specimen A1 for the laser beam at a wavelength of 157 nm was less than 1%, a difference in refractive index of the specimen A1 between before and after the laser beam irradiation, which is an indicator of compaction, was 1×10$^{-6}$ or less, and the change in birefringence of the specimen A1 between before and after the laser beam irradiation was 1 nm/cm or less.

Example 2

Silicon tetrachloride, which had been refined, was subjected to a flame hydrolysis, and the resultant soots were accumulated to provide a porous silica preform body having a diameter of 400 mm and a length of 1,000 mm. The porous silica preform body was subjected to a heat treatment at a temperature of 1300° C. in a nitrogen gas atmosphere in a furnace core tube equipped in a uniformly heating type electric furnace. The core tube temperature was raised in a temperature range from room temperature to 500° C. at a heating rate of 500° C./hr, in the temperature range from 500° C. to 1000° C., at a heating rate of 100° C./hr, in the temperature range from 1,000° C. to 1200° C. at a heating rate of 10° C./hr, and in the temperature range from 1200° C. to 1300° C. at a heating rate of 5° C./hr, and maintained at the heat treatment temperature of 1300° C. for a time of 38 hours. The heat-treated porous silica preform body had an average bulk density of 2.10 g/cm$^3$.

The heat-treated porous silica preform body has placed in a furnace core tube equipped in a zone-heating type electric furnace; and heated to a temperature of 1500° C. at a heating rate of 100° C./hr in a helium gas atmosphere to convert the porous silica preform body to a transparent silica glass.

A sample taken from the resultant silica glass was dissolved in 38% formic acid and subjected to a quantitative analysis for chlorine. It was confirmed that the chlorine content of the silica glass was less than 1 ppm which is a lower limit in chlorine detection. Also, the contents of the impurity metals contained in the silica glass were measured by a quantitative analysis using an ICP mass spectrometer.

As a result, it was confirmed that the total content of the impurity metals including alkali metals, alkaline earth metals, transition metals and others was less than 50 ppb, and the content of each individual impurity metal was less than 10 ppb.

The uniformity of the resultant silica glass represented by Δn was $1.0 \times 10^{-6}$ determined in a circular region having a diameter φ of 200 mm and in the radial direction of the glass. From a center portion in the radial direction of the resultant glass and an outer portion of the glass located 100 mm away from the center, two specimens having dimensions of 10 mm×10 mm×30 mm were cut, and two faces of each specimen opposite to each other were optically polished. A specimen B1 taken from the center portion and a specimen B2 taken from the outer portion of the glass were prepared.

In each of the specimens B1 and B2, the content of OH groups was determined from intensity of absorption at a wavelength of 2.73 μm measured by an infrared spectrometer. As a result, the OH group content was 40 ppm in the specimen B1 and 30 ppm in the specimen B2. The specimens B1 and B2 were subjected to a fictive temperature determination from the position of an absorption peak at 1120 cm$^{-1}$ in infrared spectrum. The difference $\Delta T_F$ between highest and lowest frictive temperatures of the specimens B1 and B2 was 10° C.

When $F_2$ excimer laser beam having a wavelength of 157 nm was irradiated at an energy density of 10 mJ/cm$^2$·pulse at a periodic frequency of 1,000 Hz onto the optically polished face of the specimen B1, the transmittance of the laser beam through an optical path having a length of 10 mm was 65%. After the laser beam was irradiated at 1×10$^6$ pulses, a reduction in the transmittance of the specimen B1 for the laser beam at a wavelength of 157 nm was less than 1%, a difference in refractive index of the specimen B1 between before and after the laser beam irradiation, which is an indicator of compaction, was 1×10$^{-6}$ or less, and the change in birefringence of the specimen B1 between before and after the laser beam irradiation was 1 nm/cm or less.

Example 3

Silicon tetrachloride, which had been refined, was subjected to a flame hydrolysis, and the resultant soots were accumulated to provide a porous silica preform body having a diameter of 400 mm and a length of 1,000 mm. The porous silica preform body was subjected to a heat treatment at a temperature of 1200° C. in a nitrogen gas atmosphere in a furnace core tube equipped in a uniformly heating type electric furnace. The core tube temperature was raised in a temperature range from room temperature to 500° C. at a heating rate of 500° C./hr, in the temperature range from 500° C. to 1000° C., at a heating rate of 100° C./hr, and in the temperature range from 1,000° C. to 1200° C. at a heating rate of 10° C./hr, and maintained at the heat treatment temperature of 1200° C. for a time of 84 hours. The heat-treated porous silica preform body had an average bulk density of 2.15 g/cm$^3$.

The heat-treated porous silica preform body has placed in a furnace core tube equipped in a zone-heating type electric furnace; and heated to a temperature of 1500° C. at a heating rate of 100° C./hr in a helium gas atmosphere to convert the porous silica preform body to a transparent silica glass.

A sample taken from the resultant silica glass was dissolved in 38% formic acid and subjected to a quantitative analysis for chlorine. It was confirmed that the chlorine content of the silica glass was less than 1 ppm which is a lower limit in chlorine detection. Also, the contents of the impurity metals contained in the silica glass were measured by a quantitative analysis using an ICP mass spectrometer. As a result, it was confirmed that the total content of the impurity metals including alkali metals, alkaline earth metals, transition metals and others was less than 50 ppb and the content of each individual impurity metal was less than 10 ppb.

The uniformity of the resultant silica glass represented by $\Delta n$ was $1.0\times10^{-6}$ determined in a circular region having a diameter $\phi$ of 200 mm and in the radial direction of the glass. From a center portion in the radial direction of the resultant glass and an outer portion of the glass located 100 mm away from the center, two specimens having dimensions of 10 mm×10 mm×30 mm were cut, and two faces of each specimen opposite to each other were optically polished. A specimen C1 taken from the center portion and a specimen C2 taken from the outer portion of the glass were prepared.

In each of the specimens C1 and C2, the content of OH groups was determined from intensity of absorption at a wavelength of 2.73 μm measured by an infrared spectrometer. As a result, the OH group content was 20 ppm in the specimen C1 and 10 ppm in the specimen C1. The specimens C1 and C2 were subjected to a fictive temperature determination from the position of an absorption peak at 1120 cm$^{-1}$ in infrared spectrum. The difference $\Delta T_F$ between highest and lowest frictive temperatures of the specimens C1 and C2 was 10° C.

When $F_2$ excimer laser beam having a wavelength of 157 nm was irradiated at an energy density of 10 mJ/cm$^2$·pulse at a periodic frequency of 1,000 Hz onto the optically polished face of the specimen C1, the transmittance of the laser beam through an optical path having a length of 10 mm was 75%. After the laser beam was irradiated at $1\times10^{-6}$ pulses, a reduction in the transmittance of the specimen C1 for the laser beam at a wavelength of 157 nm was less than 1%, a difference in refractive index of the specimen C1 between before and after the laser beam irradiation, which is an indicator of compaction, was $1\times10^{-6}$ or less, and the change in birefringence of the specimen C1 between before and after the laser beam irradiation was 1 nm/cm or less.

Example 4

Silicon tetrachloride, which had been refined, was subjected to a oxygen/hydrogen flame hydrolysis, and the resultant soots were accumulated to provide a porous silica preform body having a diameter of 400 mm and a length of 1,000 mm. The porous silica preform body was subjected to a heat treatment at a temperature of 1200° C. in a nitrogen gas atmosphere in a furnace core tube equipped in a uniformly heating type electric furnace. The core tube temperature was raised in a temperature range from room temperature to 500° C. at a heating rate of 500° C./hr, in the temperature range from 500° C. to 1000° C., at a heating rate of 100° C./hr, and in the temperature range from 1,000° C. to 1200° C. at a heating rate of 10° C./hr, and maintained at the heat treatment temperature of 1200° C. for a time of 96 hours. The heat-treated porous silica preform body had an average bulk density of 2.15 g/cm$^3$.

The heat-treated porous silica preform body has placed in a furnace core tube equipped in a zone-heating type electric furnace; and heated to a temperature of 1500° C. at a heating rate of 100° C./hr in a helium gas atmosphere to convert the porous silica preform body to a transparent silica glass.

A sample taken from the resultant silica glass was dissolved in 38% aqueous acid and subjected to a quantitative analysis for chlorine. It was confirmed that the chlorine content of the silica glass was less than 1 ppm which is a lower limit in chlorine detection. Also, the contents of the impurity metals contained in the silica glass were measured by a quantitative analysis using an ICP mass spectrometer. As a result, it was confirmed that the total content of the impurity metals including alkali metals, alkaline earth metals, transition metals and others was less than 50 ppb and the content of each individual impurity metal was less than 10 ppb.

The uniformity of the resultant silica glass represented by $\Delta n$ was $1.0\times10^{-6}$ determined in a circular region having a diameter $\phi$ of 200 mm and in the radial direction of the glass. From a center portion in the radial direction of the resultant glass and an outer portion of the glass located 100 mm away from the center, two specimens having dimensions of 10 mm×10 mm×30 mm were cut, and two faces of each specimen opposite to each other were optically polished. A specimen D1 taken from the center portion and a specimen D2 taken from the outer portion of the glass were prepared.

In each of the specimens D1 and D2, the content of OH groups was determined from intensity of absorption at a wavelength of 2.73 μm measured by an infrared spectrometer. As a result, the OH group content was 15 ppm in the specimen D1 and 5 ppm in the specimen D2. The specimens D1 and D2 were subjected to a fictive temperature determination from the position of an absorption peak at 1120 cm$^{-1}$ in infrared spectrum. The difference $\Delta T_F$ between highest and lowest frictive temperatures of the specimens D1 and D2 was 10° C.

When $F_2$ excimer laser beam having a wavelength of 157 nm was irradiated at an energy density of 10 mJ/cm$^2$·pulse at a periodic frequency of 1,000 Hz onto the optically polished face of the specimen D1, the transmittance of the laser beam through an optical path having a length of 10 mm was 80%. After the laser beam was irradiated at $1\times10^6$ pulses, a reduction in the transmittance of the specimen D1 for the laser beam at a wavelength of 157 nm was less than 1%, the difference in refractive index of the specimen D1 between before and after the laser beam irradiation, which is an indicator of compaction, was $1\times10^{-6}$ or less, and the change in birefringence of the specimen D1 between before and after the laser beam irradiation was 1 nm/cm or less.

Example 5

Silicon tetrachloride, which had been refined, was subjected to a oxygen/hydrogen flame hydrolysis, and the resultant soots were accumulated to provide a porous silica preform body having a diameter of 400 mm and a length of 1,000 mm. The porous silica preform body was subjected to a heat treatment at a temperature of 1300° C. in a nitrogen gas atmosphere in a furnace core tube equipped in a uniformly heating type electric furnace. The core tube temperature was raised in a temperature range from room temperature to 500° C. at a heating rate of 500° C./hr, in the temperature range from 500° C. to 1000° C., at a heating rate of 100° C./hr, in the temperature range from 1,000° C. to 1200° C. at a heating rate of 10° C./hr, and in the temperature range from 1200° C. to 1300° C. at a heating rate of 5° C./hr, and maintained at the heat treatment temperature of 1300° C. for a time of 38 hours. The heat-treated porous silica preform body had an average bulk density of 2.10 g/cm$^3$.

The heat-treated porous silica preform body has placed in a furnace core tube equipped in a zone-heating type electric furnace; and heated to a temperature of 1500° C. at a heating rate of 100° C./hr in a helium gas atmosphere to convert the porous silica preform body to a transparent silica glass.

A sample taken from the resultant silica glass was dissolved in 38% formic acid and subjected to a quantitative analysis for chlorine. It was confirmed that the chlorine content of the silica glass was less than 1 ppm which is a lower limit in chlorine detection. Also, the contents of the impurity metals contained in the silica glass were measured by a quantitative analysis using an ICP mass spectrometer. As a result, it was confirmed that the total content of the impurity metals including alkali metals, alkaline earth metals, transition metals and others was less than 50 ppb, and a content of each individual impurity metal was less than 10 ppb.

The uniformity of the resultant silica glass represented by $\Delta n$ was $1.0 \times 10^{-6}$ determined in a circular region having a diameter $\phi$ of 200 mm and in the radial direction of the glass. From a center portion in the radial direction of the resultant glass and an outer portion of the glass located 100 mm away from the center, two specimens having dimensions of 10 mm×10 mm×30 mm were cut, and two faces of each specimen opposite to each other were optically polished. A specimen E1 taken from the center portion and a specimen E1 taken from the outer portion of the glass were prepared.

In each of the specimens E1 and E2, the content of OH groups was determined from intensity of absorption at a wavelength of 2.73 $\mu$m measured by an infrared spectrometer. As a result, the OH group content was 30 ppm in the specimen E1 and 20 ppm in the specimen E2. The specimens E1 and E2 were subjected to a fictive temperature determination from the position of an absorption peak at 1120 cm$^{-1}$ in infrared spectrum. The difference $\Delta T_F$ between highest and lowest frictive temperatures of the specimens A1 and A2 was 10° C.

When $F_2$ excimer laser beam having a wavelength of 157 nm was irradiated at an energy density of 10 mJ/cm$^2$·pulse at a periodic frequency of 1,000 Hz onto the optically polished face of the specimen E1, the transmittance of the laser beam through an optical path having a length of 10 mm was 70%. After the laser beam was irradiated at $1 \times 10^6$ pulses, a reduction in the transmittance of the specimen E1 for the laser beam at a wavelength of 157 nm was less than 1%, the difference in refractive index of the specimen E1 between before and after the laser beam irradiation, which is an indicator of compaction, was $1 \times 10^{-6}$ or less, and the change in birefringence of the specimen E1 between before and after the laser beam irradiation was 1 nm/cm or less.

Comparative Example 1

Silicon tetrachloride, which had been refined, was subjected to a oxygen/hydrogen flame hydrolysis, and the resultant soots were accumulated to provide a porous silica preform body having a diameter of 400 mm and a length of 1,000 mm. The porous silica preform body was subjected to a heat treatment at a temperature of 1150° C. in a nitrogen gas atmosphere in a furnace core tube equipped in a uniformly heating type electric furnace. The core tube temperature was raised in a temperature range from room temperature to 500° C. at a heating rate of 500° C./hr, in the temperature range from 500° C. to 1000° C., at a heating rate of 100° C./hr, and in the temperature range from 1,000° C. to 1150° C. at a heating rate of 10° C./hr, and maintained at the heat treatment temperature of 1150° C. for a time of 32 hours. The heat-treated porous silica preform body had an average bulk density of 0.70 g/cm$^3$.

The heat-treated porous silica preform body has placed in a furnace core tube equipped in a zone-heating type electric furnace; and heated to a temperature of 1500° C. at a heating rate of 100° C./hr in a helium gas atmosphere to convert the porous silica preform body to a transparent silica glass.

A sample taken from the resultant silica glass was dissolved in 38% formic acid and subjected to a quantitative analysis for chlorine. It was confirmed that the chlorine content of the silica glass was less than 1 ppm which is a lower limit in chlorine detection. Also, the contents of the impurity metals contained in the silica glass were measured by a quantitative analysis using an ICP mass spectrometer. As a result, it was confirmed that the total content of the impurity metals including alkali metals, alkaline earth metals, transition metals and others was less than 50 ppb, and a content of each individual impurity metal was less than 10 ppb.

The uniformity of the resultant silica glass represented by $\Delta n$ was $8.0 \times 10^{-6}$ determined in a circular region having a diameter $\phi$ of 200 mm and in the radial direction of the glass. From a center portion in the radial direction of the resultant glass and an outer portion of the glass located 100 mm away from the center, two specimens having dimensions of 10 mm×10 mm×30 mm were cut, and two faces of each specimen opposite to each other were optically polished. A specimen F1 taken from the center portion and a specimen F2 taken from the outer portion of the glass were prepared.

In each of the specimens F1 and F2, the content of OH groups was determined from intensity of absorption at a wavelength of 2.73 $\mu$m measured by an infrared spectrometer. As a result, the OH group content was 170 ppm in the specimen F1 and 100 ppm in the specimen F2. The specimens F1 and F2 were subjected to a fictive temperature determination from the position of an absorption peak at 1120 cm$^{-1}$ in infrared spectrum. The difference $\Delta T_F$ between highest and lowest frictive temperatures of the specimens F1 and F2 was 80° C.

When $F_2$ excimer laser beam having a wavelength of 157 nm was irradiated at an energy density of 10 mJ/cm$^2$·pulse at a periodic frequency of 1,000 Hz onto the optically polished face of the specimen F1, the transmittance of the laser beam through an optical path having a length of 10 mm was 5%. After the laser beam was irradiated at $1 \times 10^6$ pulses, a reduction in the transmittance of the specimen F1 for the laser beam at a wavelength of 157 nm was 50%, the difference in refractive index of the specimen F1 between before and after the laser beam irradiation, which is an indicator of compaction, was $10 \times 10^{-6}$, and the change in birefringence of the specimen F1 between before and after the laser beam irradiation was 10 nm/cm.

Comparative Example 2

Silicon tetrachloride, which had been refined, was subjected to a oxygen/hydrogen flame hydrolysis, and the resultant soots were accumulated to provide a porous silica preform body having a diameter of 400 mm and a length of 1,000 mm. The porous silica preform body was subjected to a heat treatment at a temperature of 1300° C. in a nitrogen gas atmosphere in a furnace core tube equipped in a uniformly heating type electric furnace. The core tube temperature was raised in a temperature range from room temperature to 500° C. at a heating rate of 500° C./hr, in the temperature range from 500° C. to 1000° C., at a heating rate of 100° C./hr, in the temperature range from 1,000° C. to 1200° C. at a heating rate of 10° C./hr, and in the temperature range from 1200° C. to 1300° C. at a heating rate of 5° C./hr, and maintained at the heat treatment temperature of 1300° C. for a time of 12 hours. The heat-treated porous silica preform body had an average bulk density of 1.20 g/cm$^3$.

The heat-treated porous silica preform body has placed in a furnace core tube equipped in a zone-heating type electric furnace; and heated to a temperature of 1500° C. at a heating rate of 100° C./hr in a helium gas atmosphere to convert the porous silica preform body to a transparent silica glass.

A sample taken from the resultant silica glass was dissolved in 38% formic acid and subjected to a quantitative analysis for chlorine. It was confirmed that the chlorine content of the silica glass was less than 1 ppm which is a lower limit in chlorine detection. Also, the contents of the impurity metals contained in the silica glass were measured by a quantitative analysis using an ICP mass spectrometer. As a result, it was confirmed that the total content of the impurity metals including alkali metals, alkaline earth metals, transition metals and others was less than 50 ppb and the content of each individual impurity metal was less than 10 ppb.

The uniformity of the resultant silica glass represented by $\Delta n$ was $5.0\times10^{-6}$ determined in a circular region having a diameter $\phi$ of 200 mm and in the radial direction of the glass. From a center portion in the radial direction of the resultant glass and an outer portion of the glass located 100 mm away from the center, two specimens having dimensions of 10 mm×10 mm×30 mm were cut, and two faces of each specimen opposite to each other were optically polished. A specimen G1 taken from the center portion and a specimen G2 taken from the outer portion of the glass were prepared.

In each of the specimens G1 and G2, the content of OH groups was determined from intensity of absorption at a wavelength of 2.73 $\mu$m measured by an infrared spectrometer. As a result, the OH group content was 100 ppm in the specimen G1 and 80 ppm in the specimen G2. The specimens G1 and G2 were subjected to a fictive temperature determination from the position of an absorption peak at 1120 cm$^{-1}$ in infrared spectrum. The difference $\Delta T_F$ between highest and lowest frictive temperatures of the specimens G1 and G2 was 60° C.

When $F_2$ excimer laser beam having a wavelength of 157 nm was irradiated at an energy density of 10 mJ/cm$^2$·pulse at a periodic frequency of 1,000 Hz onto the optically polished face of the specimen G1, the transmittance of the laser beam through an optical path having a length of 10 mm was 30%. After the laser beam was irradiated at $1\times10^6$ pulses, a reduction in the transmittance of the specimen A1 for the laser beam at a wavelength of 157 nm was 40%, a difference in refractive index of the specimen G1 between before and after the laser beam irradiation, which is an indicator of compaction, was $10\times10^{-6}$ and the change in birefringence of the specimen A1 between before and after the laser beam irradiation was 10 nm/cm.

Comparative Example 3

Silicon tetrachloride, which has been refined, was subjected to a oxygen/hydrogen flame hydrolysis, and the resultant soots were accumulated to provide a porous silica preform body having a diameter of 400 mm and a length of 1,000 mm. The porous silica preform body was subjected to a heat treatment at a temperature of 1300° C. in a nitrogen gas atmosphere in a furnace core tube equipped in a uniformly heating type electric furnace. The core tube temperature was raised in a temperature range from room temperature to 500° C. at a heating rate of 500° C./hr, in the temperature range from 500° C. to 1000° C., at a heating rate of 100° C./hr, in the temperature range from 1, ooo° C. to 1200° C. at a heating rate of 10° C./hr, and in the temperature range from 1200° C. to 1300° C. at a heating rate of 5° C./hr, and maintained at the heat treatment temperature of 1300° C. for a time of 16 hours. The heat-treated porous silica preform body had an average bulk density of 1.40 g/cm$^3$.

The heat-treated porous silica preform body has placed in a furnace core tube equipped in a zone-heating type electric furnace; and heated to a temperature of 1500° C. at a heating rate of 200° C./hr in a helium gas atmosphere to convert the porous silica preform body to a transparent silica glass.

A sample taken from the resultant silica glass was dissolved in 38% formic acid and subjected to a quantitative analysis for chlorine. It was confirmed that the chlorine content of the silica glass was less than 1 ppm which is a lower limit in chlorine detection. Also, the contents of the impurity metals contained in the silica glass were measured by a quantitative analysis using an ICP mass spectrometer. As a result, it was confirmed that the total content of the impurity metals including alkali metals, alkaline earth metals, transition metals and others was less than 50 ppb, and the content of each individual impurity metal was less than 10 ppb.

The uniformity of the resultant silica glass represented by $\Delta n$ was $6.0\times10^{-6}$ determined in a circular region having a diameter $\phi$ of 200 mm and in the radial direction of the glass. From a center portion in the radial direction of the resultant glass and an outer portion of the glass located 100 mm away from the center, two specimens having dimensions of 10 mm×10 mm×30 mm were cut, and two faces of each specimen opposite to each other were optically polished. A specimen H1 taken from the center portion and a specimen H2 taken from the outer portion of the glass were prepared.

In each of the specimens H1 and H2, the content of OH groups was determined from intensity of absorption at a wavelength of 2.73 $\mu$m measured by an infrared spectrometer. As a result, the OH group content was 90 ppm in the specimen H1 and 60 ppm in the specimen H2. The specimens H1 and H2 were subjected to a fictive temperature determination from the position of an absorption peak at 1120 cm$^{-6}$ in infrared spectrum. The difference $\Delta T_F$ between highest and lowest frictive temperatures of the specimens H1 and H2 was 70° C.

When $F_2$ excimer laser beam having a wavelength of 157 nm was irradiated at an energy density of 10 mJ/cm$^2$·pulse at a periodic frequency of 1,000 Hz onto the optically polished face of the specimen H1, the transmittance of the laser beam through an optical path having a length of 10 mm was 35%. After the laser beam was irradiated at $1\times10^6$ pulses, a reduction in the transmittance of the specimen H1 for the laser beam at a wavelength of 157 nm was 40%, the difference in refractive index of the specimen H1 between before and after the laser beam irradiation, which is an indicator of compaction, was $7\times10^{-6}$, and the change in birefringence of the specimen H1 between before and after the laser beam irradiation was 7 nm/cm.

Comparative Example 4

Silicon tetrachloride, which has been refined, was subjected to a oxygen/hydrogen flame hydrolysis, and the resultant soots were accumulated to provide a porous silica preform body having a diameter of 400 mm and a length of 1,000 mm. The porous silica preform body was subjected to a heat treatment at a temperature of 1300° C. in a nitrogen gas atmosphere in a furnace core tube equipped in a uniformly heating type electric furnace. The core tube temperature was raised in a temperature range from room temperature to 1000° C. at a heating rate of 1800° C./hr, in the temperature range from 1000° C. to 1200° C., at a heating rate of 500° C./hr, and in the temperature range from 1,200° C. to 1300° C. at a heating rate of 200° C./hr, and maintained at the heat treatment temperature of 1300° C. for a time of 16 hours. The heat-treated porous silica preform body had an average bulk density of 1.30 g/cm$^3$.

The heat-treated porous silica preform body has placed in a furnace core tube equipped in a zone-heating type electric furnace; and heated to a temperature of 1500° C. at a heating rate of 100° C./hr in a helium gas atmosphere to convert the porous silica preform body to a transparent silica glass.

A sample taken from the resultant silica glass was dissolved in 38% formic acid and subjected to a quantitative analysis for chlorine. It was confirmed that the chlorine content of the silica glass was less than 1 ppm which is a lower limit in chlorine detection. Also, the contents of the impurity metals contained in the silica glass were measured by a quantitative analysis using an ICP mass spectrometer. As a result, it was confirmed that the total content of the impurity metals including alkali metals, alkaline earth metals, transition metals and others was less than 50 ppb, and the content of each individual impurity metal was less than 10 ppb.

The uniformity of the resultant silica glass represented by Δn was 6.0×10$^{-6}$ determined in a circular region having a diameter φ of 200 mm and in the radial direction of the glass. From a center portion in the radial direction of the resultant glass and an outer portion of the glass located 100 mm away from the center, two specimens having dimensions of 10 mm×10 mm×30 mm were cut, and two faces of each specimen opposite to each other were optically polished. A specimen I1 taken from the center portion and a specimen I2 taken from the outer portion of the glass were prepared.

In each of the specimens I1 and I2, the content of OH groups was determined from intensity of absorption at a wavelength of 2.73 μm measured by an infrared spectrometer. As a result, the OH group content was 100 ppm in the specimen I1 and 30 ppm in the specimen I2. The specimens I1 and I2 were subjected to a fictive temperature determination from the position of an absorption peak at 1120 cm$^{-1}$ in infrared spectrum. The difference $\Delta T_F$ between highest and lowest frictive temperatures of the specimens I1 and I2 was 70° C.

When F$_2$ excimer laser beam having a wavelength of 157 nm was irradiated at an energy density of 10 mJ/cm$^2$·pulse at a periodic frequency of 1,000 Hz onto the optically polished face of the specimen I1, the transmittance of the laser beam through an optical path having a length of 10 mm was 30%. After the laser beam was irradiated at 1×10$^6$ pulses, a reduction in the transmittance of the specimen I1 for the laser beam at a wavelength of 157 nm was 30%, a difference in refractive index of the specimen I1 between before and after the laser beam irradiation, which is an indicator of compaction, was 6×10$^{-6}$, and the change in birefringence of the specimen I1 between before and after the laser beam irradiation was 6 nm/cm.

In Table 1, the heating conditions, the transparent glass-forming conditions the chlorine content, the $\Delta T_F$, the initial transmittance at 157 nm, and the resistance to laser beam of the specimens A to I prepared in Examples 1 to 5 and comparative Examples 1 to 4 are shown. The resistance to laser beam was represented by a reduction in transmittance at a wavelength of 157 nm due to an irradiation of F$_2$ excimer laser beam at 1×10$^6$ pulses.

TABLE 1

| | | | Production of transparent silica glass | | | Transparent silica glass | | | |
| --- | --- | --- | --- | --- | --- | --- | --- | --- | --- |
| Item | | | Heat-treatment Temperature (° C.) × time | Bulk density of heat treated preform | Heating rate (° C./hr) for transparent glass | Content (ppm) | | Initial transmittance of F$_2$ excimer | Reduction in transmittance due to irradiation of F$_2$ excimer |
| Example No. | Specimen | Atmosphere | (hr) | body | formation | OH | Cl | laser beam | laser beam |
| Example | | | | | | | | | |
| 1 | A | N$_2$ | 1300 × 38 | 2.10 | 100 | 35 | <1 | 65 | <1 |
| 2 | B | He | 1300 × 32 | 2.10 | 100 | 30 | <1 | 70 | <1 |
| 3 | C | N$_2$ | 1200 × 96 | 2.15 | 100 | 15 | <1 | 75 | <1 |
| 4 | D | He | 1200 × 84 | 2.15 | 100 | 10 | <1 | 80 | <1 |
| 5 | E | N$_2$ | 1300 × 38 | 2.10 | 50 | 25 | <1 | 70 | <1 |
| Comparative Example | | | | | | | | | |
| 1 | F | N$_2$ | 1300 × 12 | 1.20 | 100 | 90 | <1 | 30 | 40 |
| 2 | G | N$_2$ | 1300 × 16 | 1.40 | 200 | 150 | <1 | 10 | 40 |
| 3 | H | N$_2$ | 1300 × 32 | 2.00 | 100 | 80 | <1 | 35 | 40 |
| 4 | I | N$_2$ | 1150 × 32 | 0.70 | 100 | 160 | <1 | 5 | 50 |

In Table 1, the initial transmittance of the silica glass before the irradiation treatment of F$_2$ laser beam and the reduction in transmittance of the silica glass due to the F$_2$ laser beam irradiation treatment were calculated in accordance with the following equations.

Initial transmittance (%)=(T$_1$/T$_0$)×100 wherein T$_0$ represents a pulse intensity of F$_2$ laser beam irradiated toward a specimen, and T$_1$ represents a pulse intensity of F$_2$ laser beam transmitted through the specimen each at the initial stage of the F$_2$ laser beam irradiation.

Reduction ΔT in transmittance due to irradiation (%)= T$_A$−T$_B$.
wherein T$_A$=(T$_1$/T$_0$)×100,

T$_B$=(T$_2$/T$_0$)×100, $T_2$ represents a pulse intensity of $F_2$ laser beam transmitted through the specimen after subjected to a $F_2$ laser beam irradiation at 10 mJ/cm² at 1×10⁶ pulses, and $T_0$ and $T_1$ are as defined above.

Example 6

A synthetic silica glass was produced by the same procedures as in Example 1, except that the heat treatment procedure in the uniformly heating type electric furnace was carried out at a heat treatment temperature of 1350° C. for 38 hours to prepare a heat-treated porous silica preform body.

A sample taken from the resultant silica glass was dissolved in 38% formic acid and subjected to a quantitative analysis for chlorine. It was confirmed that the chlorine content of the silica glass was less than 1 ppm which is a lower limit in chlorine detection. Also, the contents of the impurity metals contained in the silica glass were measured by a quantitative analysis using an ICP mass spectrometer. As a result, it was confirmed that the total content of the impurity metals including alkali metals, alkaline earth metals, transition metals and others was less than 50 ppb, and the content of each individual impurity metal was less than 10 ppb.

The uniformity of the resultant silica glass represented by Δn was $1.0 \times 10^{-6}$ determined in a circular region having a diameter φ of 200 mm and in the radial direction of the glass. From a center portion in the radial direction of the resultant glass and an outer portion of the glass located 100 mm away from the center, two specimens having dimensions of 10 mm×10 mm×30 mm were cut, and two faces of each specimen opposite to each other were optically polished. A specimen J1 taken from the center portion and a specimen J2 taken from the outer portion of the glass were prepared.

In each of the specimens J1 and J2, the content of OH groups was determined from intensity of absorption at a wavelength of 2.73 μmp measured by an infrared spectrometer. As a result, the OH group content was 30 ppm in the specimen J1 and 20 ppm in the specimen J2. The specimens J1 and J2 were subjected to a fictive temperature determination from the position of an absorption peak at 1120 cm⁻¹ in infrared spectrum. The difference $\Delta T_F$ between highest and lowest frictive temperatures of the specimens A1 and A2 was 10° C.

When $F_2$ excimer laser beam having a wavelength of 157 nm was irradiated at an energy density of 10 mJ/cm²·pulse at a periodic frequency of 1,000 Hz onto the optically polished face of the specimen J1, the transmittance of the laser beam through an optical path having a length of 10 mm was 70%. After the laser beam was irradiated at 1×10⁶ pulses, the reduction in the transmittance of the specimen J1 for the laser beam at a wavelength of 157 nm was less than 1%, the difference in refractive index of the specimen J1 between before and after the laser beam irradiation, which is an indicator of compaction, was $1 \times 10^{-6}$ or less, and the change in birefringence of the specimen J1 between before and after the laser beam irradiation was 1 nm/cm or less.

Example 7

A transparent synthetic silica glass was produced by the same procedures as in Example 1, except that the heat treatment procedure in the uniformly heating type electric furnace was carried out in a nitrogen gas atmosphere for 16 hours and then in a mixed CO and $N_2$ gas (in a mixing ratio $CO/N_2$ of 10/90) for 8 hours at the same temperature and for the same time as those in Example 1, to prepare a heat-treated porous silica preform body.

A sample taken from the resultant silica glass was dissolved in 38% formic acid and subjected to a quantitative analysis for chlorine. It was confirmed that the chlorine content of the silica glass was less than 1 ppm which is a lower limit in chlorine detection. Also, the contents of the impurity metals contained in the silica glass were measured by a quantitative analysis using an ICP mass spectrometer. As a result, it was confirmed that the total content of the impurity metals including alkali metals, alkaline earth metals, transition metals and others was less than 50 ppb, and the content of each individual impurity metal was less than 10 ppb.

The uniformity of the resultant silica glass represented by Δn was $1.0 \times 10^{-6}$ determined in a circular region having a diameter φ of 200 mm and in the radial direction of the glass. From a center portion in the radial direction of the resultant glass and an outer portion of the glass located 100 mm away from the center, two specimens having dimensions of 10 mm×10 mm×30 mm were cut, and two faces of each specimen opposite to each other were optically polished. A specimen K1 taken from the center portion and a specimen K2 taken from the outer portion of the glass were prepared.

In each of the specimens K1 and K2, the content of OH groups was determined from intensity of absorption at a wavelength of 2.73 μm measured by an infrared spectrometer. As a result, the OH group content was 40 ppm in the specimen K1 and 30 ppm in the specimen K2. The specimens K1 and K2 were subjected to a fictive temperature ($T_F$) determination from the position of an absorption peak at 1120 cm⁻¹ in infrared spectrum. The difference $\Delta T_F$ between highest and lowest frictive temperatures of the specimens K1 and K2 was 10° C.

When $F_2$ excimer laser beam having a wavelength of 157 nm was irradiated at an energy density of 10 mJ/cm²·pulse at a periodic frequency of 1,000 Hz onto the optically polished face of the specimen K1, the transmittance of the laser beam through an optical path having a length of 10 mm was 74%. After the laser beam was irradiated at 1×10⁶ pulses, a reduction in the transmittance of the specimen K1 for the laser beam at a wavelength of 157 nm was less than 1%, the difference in refractive index of the specimen K1 between before and after the laser beam irradiation, which is an indicator of compaction, was $1 \times 10^{-6}$ or less, and the change in birefringence of the specimen K1 between before and after the laser beam irradiation was 1 nm/cm or less.

Example 8

A transparent synthetic silica glass was produced by the same procedures as in Example 1, except that in the heat treatment in the uniformly heating type electric furnace, the heat treatment atmosphere consisted of a mixed $H_2/N_2$ gas (in a mixing ratio $H_2/N_2$ of 10/90) and the heat treatment time was 15 hours, to prepare a heat-treated porous silica preform body.

A sample taken from the resultant silica glass was dissolved in 38% formic acid and subjected to a quantitative analysis for chlorine. It was confirmed that the chlorine content of the silica glass was less than 1 ppm which is a lower limit in chlorine detection. Also, the contents of the impurity metals contained in the silica glass were measured by a quantitative analysis using an ICP mass spectrometer. As a result, it was confirmed that the total content of the impurity metals including alkali metals, alkaline earth metals, transition metals and others was less than 50 ppb, and the content of each individual impurity metals was less than 10 ppb.

The uniformity of the resultant silica glass represented by Δn was $1.0\times10^{-6}$ determined in a circular region having a diameter φ of 200 mm and in the radial direction of the glass. From a center portion in the radial direction of the resultant glass and an outer portion of the glass located 100 mm away from the center, two specimens having dimensions of 10 mm×10 mm×30 mm were cut, and two faces of each specimen opposite to each other were optically polished. A specimen L1 taken from the center portion and a specimen L2 taken from the outer portion of the glass were prepared.

In each of the specimens L1 and L2, the content of OH groups was determined from intensity of absorption at a wavelength of 2.73 μm measured by an infrared spectrometer. As a result, the OH group content was 45 ppm in the specimen L1 and 35 ppm in the specimen L2. The specimens L1 and L2 were subjected to a determination of fictive temperature ($T_F$) from the position of an absorption peak at 1120 cm$^{-1}$ in infrared spectrum. The difference $\Delta T_F$ between highest and lowest frictive temperatures of the specimens L1 and L2 was 10° C.

When $F_2$ excimer laser beam having a wavelength of 157 nm was irradiated at an energy density of 10 mJ/cm$^2$·pulse at a periodic frequency of 1,000 Hz onto the optically polished face of the specimen L1, the transmittance of the laser beam through an optical path having a length of 10 mm was 65%. After the laser beam was irradiated at $1\times10^6$ pulses, the reduction in the transmittance of the specimen L1 for the laser beam at a wavelength of 157 nm was less than 1%, the difference in refractive index of the specimen L1 between before and after the laser beam irradiation, which is an indicator of compaction, was $1\times10^{-6}$ or less, and the change in birefringence of the specimen L1 between before and after the laser beam irradiation was 1 nm/cm or less.

In Table 2, the heat treatment conditions, the OH group content, the Cl content and the transmittance of $F_2$ excimer laser beam of the silica glasses of Examples 6 to 8 are shown.

TABLE 2

| Item Example | | Heat treatment | | | | Transmittance of $F_2$ excimer laser beam (%) |
| --- | --- | --- | --- | --- | --- | --- |
| | | Atmos- | Heating | Content (ppm) | | |
| No. | Specimen | phere | time (hr) | OH | Cl | |
| Example | | | | | | |
| 6 | J | $N_2$ | 38 | 20 to 30 | <1 | 70 |
| 7 | K | $N_2$ CO/$N_2$ | 16 8 | 30 to 40 | <1 | 74 |
| 8 | L | $H_2/N_2$ | 15 | 35 to 45 | <1 | 65 |

Example 9

Specimens M1 and M2 having dimensions of 10 mm×10 mm×30 mm were prepared from the same silica glass as in Example 6 by the same cutting and two opposite face-polishing procedures as in Example 6.

Toward the specimen M1, a beam having a wavelength of 172 nm and emitted from a dielectric barrier discharge excimer lamp was irradiated under vacuum. The transmittance of the lamp beam through the specimen M1 was reduced with increase in irradiation time. After the irradiation was continued for about 100 hours, the transmittance was reduced to about 55% of the initial transmittance. However, after that, no reduction in the transmittance was found even when the irradiation was further applied to the specimen M1.

Separately, toward the specimen M2, ArF excimer laser beam having a wavelength of 193 nm was irradiated at an energy density of 100 mJ/cm$^2$·pulse at a periodic frequence of 100 Hz. The laser beam transmittance of the specimen M2 was reduced with increase in time. After $10^6$ irradiation shots, the transmittance was reduced to about 83% of the initial transmittance. However, no further reduction in the transmittance of M1 was found even after the irradiation was continued until $10^7$ shots.

Example 10

Specimens N1 and N2 having dimensions of 10 mm×10 mm×30 mm were prepared from the same silica glass as in Example 7 by the same cutting and two opposite face-polishing procedures as in Example 7.

Toward the specimen N1, a beam having a wavelength of 172 nm and emitted from a dielectric barrier discharge excimer lamp was irradiated under vacuum. The transmittance of the lamp beam through the specimen N1 was reduced with increase in irradiation time. After the irradiation was continued for about 100 hours, the transmittance was reduced to about 60% of the initial transmittance. However, after that, no reduction in the transmittance was found even when the irradiation was further applied to the specimen N1.

Separately, toward the specimen N2, ArF excimer laser beam having a wavelength of 193 nm was irradiated at an energy density of 100 mJ/cm$^2$·pulse at a periodical frequence of 100 Hz. The laser beam transmittance of the specimen N2 was reduced with increase in time. After $10^6$ irradiation shots, the transmittance was reduced to about 85% of the initial transmittance. However, no further reduction in the transmittance of N1 was found even after the irradiation was continued until $10^7$ shots.

Example 11

Specimens 01 and 02 having dimensions of 10 mm×10 mm×30 mm were prepared from the same silica glass as in Example 8 by the same cutting and two opposite face-polishing procedures as in Example 8.

Toward the specimen 01, a beam having a wavelength of 172 nm and emitted from a dielectric barrier discharge excimer lamp was irradiated under vacuum. The transmittance of the lamp beam through the specimen 01 was reduced with increase in irradiation time. After the irradiation was continued for about 100 hours, the transmittance was reduced to about 50% of the initial transmittance. However, after that, no reduction in the transmittance was found even when the irradiation was further applied to the specimen 01.

Separately, toward the specimen 02, ArF excimer laser beam having a wavelength of 193 nm was irradiated at an energy density of 100 mJ/cm$^2$·pulse at a periodical frequence of 100 Hz. The laser beam transmittance of the specimen 02 was reduced with increase in time. After $10^6$ irradiation shots, the transmittance was reduced to about 80% of the initial transmittance. However, no further reduction in the transmittance of 01 was found even after the irradiation was continued until $10^7$ shots.

Comparative Example 5

Specimens P1 and P2 having dimensions of 10 mm×10 mm×30 mm were prepared from the same silica glass as in Comparative Example 3 by the same cutting and two opposite face-polishing procedures as in Comparative Example 3.

Toward the specimen P1, a beam having a wavelength of 172 nm and emitted from a dielectric barrier discharge excimer lamp was irradiated under vacuum. The transmittance of the lamp beam through the specimen P1 was reduced with increase in irradiation time. After the irradiation was continued for about 100 hours, the transmittance was reduced to about 45% of the initial transmittance. The transmittance of P1 was further gradually reduced with the irradiation time, and did not stabilize at a constant value.

Separately, toward the specimen P2, ArF excimer laser beam having a wavelength of 193 nm was irradiated at an energy density of 100 mJ/cm$^2$·pulse at a periodical frequence of 100 Hz. The laser beam transmittance of the specimen M2 was reduced with increase in time. After $10^6$ irradiation shots, the transmittance was reduced to about 79% of the initial transmittance.

When the irradiation was continued until $10^7$ shots, the transmittance of P2 was further gradually reduced and did not stabilize at a constant level.

Comparative Example 6

Specimens Q1 and Q2 having dimensions of 10 mm×10 mm×30 mm were prepared from the same silica glass as in Comparative Example 4 by the same cutting and two opposite face-polishing procedures as in Comparative Example 4.

Toward the specimen Q1, a beam having a wavelength of 172 nm and emitted from a dielectric barrier discharge excimer lamp was irradiated under vacuum. The transmittance of the lamp beam through the specimen M1 was reduced with increase in irradiation time. After the irradiation was continued for about 100 hours, the transmittance was reduced to about 45% of the initial transmittance. When the radiation was further continued, the transmittance of Q2 was gradually reduced and did not stabilize to a constant level.

Separately, toward the specimen Q2, ArF excimer laser beam having a wavelength of 193 nm was irradiated at an energy density of 100 mJ/cm$^2$·pulse at a periodic frequence of 100 Hz. The laser beam transmittance of the specimen M2 was reduced with increase in time. After $10^6$ irradiation shots, the transmittance was reduced to about 79% of the initial transmittance.

When the irradiation was continued until $10^7$ irradiation shots, the transmittance of Q2 was gradually reduced and did not stabilize at a constant level.

Comparative Example 7

A synthetic silica glass was produced by a direct method in which a starting material consisting of silicon tetrachloride was hydrolyzed in an oxygen/hydrogen flame, the resultant silica was directly accumulated at a temperature of 1600° C. or more to provide a silica glass. The resultant glass had a diameter of 200 mm and a length of 1200 mm.

The content of the OH groups contained in the glass was calculated from the absorption intensity at 2.73 $\mu$m in an infrared spectrum. In the result, the OH group content was 700 ppm. A portion of the resultant glass was dissolved in 38% formic acid and subjected to an quantitative analysis of chlorine. The resultant chlorine content was 150 ppm. Also, the content of the impurity metals including alkali metals, alkaline earth metals, transition metals and the others by a quantitative analysis using a ICP mass spectrometer. The total content of the impurity metals was 50 ppb or less and the content of each individual impurity metal was less than 10 ppb.

Two specimens R1 and R2 having dimensions of 10 mm×10 mm×30 mm were cut from the glass, and two opposite faces of each specimen were optically polished.

Toward the specimen R1, a beam having a wavelength of 172 nm and emitted from a dielectric barrier discharge excimer lamp was irradiated under vacuum. The transmittance of the lamp beam through the specimen R1 was reduced with increase in irradiation time. After the irradiation was continued for about 100 hours, the transmittance was reduced to about 75% of the initial transmittance. When the irradiation was continued, the transmittance of R1 was further gradually reduced and did not stabilize at a constant level.

Separately, toward the specimen R2, ArF excimer laser beam having a wavelength of 193 nm was irradiated at an energy density of 100 mJ/cm$^2$·pulse at a periodical frequence of 100 Hz. The laser beam transmittance of the specimen R2 was reduced with increase in time. After $10^6$ irradiation shots, the transmittance was reduced to about 92% of the initial transmittance.

When the irradiation was continued until $10^7$ irradiation shots, the transmittance of R2 was further gradually reduced and did not stabilize at a constant level.

FIG. 1 shows relationship between the transmittance of glasses M1 to R1 of Examples 9 to 11 and Comparative Examples 5 to 7 for excimer lamp beam with a wavelength of 172 nm and the excimer lamp beam-irradiation time.

FIG. 2 shows relationships between the transmittance of glasses M2 to R2 of Examples 9 to 11 and Comparative Examples 5 to 7 for ArF excimer laser beam with a wavelength of 193 nm and the excimer laser beam-irradiation time (sec).

Examples 9 to 11, Comparative Examples 5 to 7 and FIGS. 1 and 2 show that, in the synthetic silica glass of the present invention, when the OH group content is controlled to 1 to 70 ppm, a reduction in transmittance of ultraviolet rays through the glass due to application of an irradiation of the ultraviolet rays thereto occurs until a certain dose of ultraviolet rays is applied to the glass, and thereafter, substantially no reduction in the transmittance occurs even when the ultraviolet rays are applied to the glass, whereas in the silica glass of the comparative examples, the reduction in transmittance continuously occurs with the lapse of irradiation time. Thus, after applying a certain dose of ultraviolet rays, the silica glass of the present invention exhibit a high resistance to ultraviolet rays and can keep the ultraviolet ray-transmittance constant.

As explained above in detail, the synthetic silica glass of the present invention can be produced by the method of the present invention in which the soots produced by the soot method are heat treated in a $N_2$ gas or a reducing gas atmosphere under such a condition that only the associated OH groups contained in the soots are condensed with each other, for a long time, before converting the soots to a transparent glass. In the resultant silica glass, the fictional temperature distribution is small, the unstable precursory defects are removed and the generation of defects in the soots is prevented. The resultant silica glass of the present invention has a OH group content of 1 to 70 ppm, a chlorine (Cl) content of less than 1 ppm, a total content of impurity metals including alkali metals, alkaline earth metals, transition metals and others, of 50 ppb or less and a content of each individual impurity metal of less than 10 ppb. Also, even after ultraviolet rays having a wavelength of 160 to 300 nm are continuously irradiated, the resultant silica glass of the present invention exhibits a transmittance of 40% or more for ultraviolet rays with a wavelength of 172 to 200 nm and a high transmittance of 60% or more for ultraviolet rays having a wavelength of 157 nm. Thus the synthetic silica glass having the above-mentioned excellent properties is useful for ultraviolet ray-transparent optical glass materials.

Also, the synthetic silica glass of the present invention is advantageous in that since the change in structure of the glass due to the heat treatment is small, a glass material having a high uniformity in refractive index can be easily obtained, and since the compaction of the glass is low, the glass of the present invention is suitable as an optical glass material for lithography using a $F_2$ laser. Further, since the OH group content is low, the resistance of the glass to radiation is high, and thus the silica glass of the present invention is useful for image fibers for observing the inside of atomic furnace having a high radioactivity and for optical fibers for communication systems exposed to radioactivity.

Further, the silica glass of the present invention exhibit a high viscosity at a high temperature and thus is useful as a high purity material for the production of semiconductors.

Furthermore, the silicon glass of the present invention exhibits a high dimensional stability in a heat cycle and thus is useful as a substrate-forming material for a polysilicon TFT. Still furthermore, the silica glass of the present invention has a very low gas desorption, and a high resistance to deterioration, and thus is useful for various types of tubes and bulbs for lamps.

What is claimed is:

1. An ultraviolet ray-transparent optical glass material comprising a synthetic silica glass produced from a silicon compound having a high degree of purity by a soot method in which the silicon compound is flame-hydrolyzed, the resultant soots are accumulated to form a porous silica preform body and the porous silica preform body is converted to a transparent glass by heating in a gas atmosphere consisting of nitrogen, helium, a mixture of carbon monoxide with nitrogen or a mixture of nitrogen with helium, said synthetic silica glass containing substantially no impurity other than hydroxyl group, and having a difference between highest and lowest fictive temperatures of the glass of 50° C. or less, and a transmittance of ultraviolet rays at a wave length of 157 nm through an optical path having a length of 10 mm of 60% or more.

2. The ultraviolet ray-transparent optical glass material as claimed in claim 1, wherein the synthetic silica glass has a hydroxyl group content of 1 to 70 ppm, a chlorine content of less than 1 ppm, and a total impurity metal content of 50 ppb or less in which the contents of individual impurity metals are each less than 10 ppb.

3. The ultraviolet ray-transparent optical glass material as claimed in claim 1, wherein the synthetic silica glass has a transmittance of ultraviolet rays having a wavelength of 172 to 200 nm of 40% or more even after the glass is exposed to an irradiation of ultraviolet rays at a wavelength of 160 to 300 nm for one hour.

4. The ultraviolet ray-transparent optical glass material as claimed in claim 1, wherein the synthetic silica glass has a high uniformity represented by a differential refractive index $\Delta n$ of $2 \times 10^{-6}$ or less determined in a circular region having a diameter $\phi$ of 200 mm.

5. A method of producing an ultraviolet ray-transparent optical glass material comprising producing a synthetic silica glass from a silicon compound having a high degree of purity of a soot method in which the silicon compound is flame-hydrolyzed;

accumulating the resultant soot to form a porous silica preform body;

first heat-treating the porous silica perform body at a temperature which does not cause the porous silica preform body to be transparent; and second heat-treating the first heat-treated porous silica preform body at a temperature which is higher than the first heat-treatment temperature and causes the first heat-treated porous silica preform body to be transparent, said first and second heat-treatments being carried out in a gas atmosphere consisting of nitrogen, helium, a mixture of carbon monoxide with nitrogen or a mixture of nitrogen with helium, thereby to produce an ultraviolet ray-transparent optical glass material containing substantially no impurity other than hydroxyl group, and having a difference between highest and lowest fictive temperatures of the glass of 50° C. or less, and a transmittance of ultraviolet rays at a wave length of 157 nm through an optical path having a length of 10 mm of 60% or more.

6. The method of producing the ultraviolet-ray transparent optical glass material as claimed in claim 5, wherein the first heat-treatment step for the porous silica preform body is carried out at a temperature of 1100 to 1450° C. for 3 hours or more.

7. The method of producing the ultraviolet ray-transparent optical glass material as claimed in claim 5, wherein the first and second heat-treatment steps are carried out in a nitrogen gas atmosphere.

8. The method of producing the ultraviolet ray-transparent optical glass material as claimed in claim 5, wherein the first and second heat-treatment step are carried out in an atmosphere containing hydrogen gas.

9. The method of producing the ultraviolet ray-transparent optical glass material as claimed in claim 5, wherein the first and second heat-treatment steps are carried out in an atmosphere containing carbon monoxide gas.

10. The method of producing the ultraviolet ray-transparent optical glass material as claimed in claim 5, wherein the first heat-treatment step is carried out at a temperature of 1200° C. to 1350° C., and before the first heat-treatment step, the porous silica preform body is heated from room temperature to 500° C. at a heating rate of 100 to 1500° C./hour; from 500° C. to 1000° C. at a heating rate of 50 to 1000° C./hour; from 1000 to 1200° C. at a heating rate of 5 to 200° C./hour; and from 1200° C. to 1350° C. at a heating rate of 1 to 100° C./hour.

11. The method of producing the ultraviolet ray-transparent optical glass material as claimed in claim 5, wherein in the first heat-treatment step, the first heat-treatment temperature is maintained at a highest level for 16 hours or more but not more than 216 hours.

12. The method of producing the ultraviolet ray-transparent optical glass material as claimed in claim 5, wherein the porous silica preform body heated in the first heat-treatment step has average bulk density of 1.40 g/cm$^3$ or more but not more than 2.20 g/cm$^3$.

13. The method of producing the ultraviolet ray-transparent optical glass material as claimed in claim 5, wherein the first heat-treatment step is carried out in a helium gas atmosphere non-diluted or diluted with at least one inert gas other than helium gas and containing nitrogen gas.

14. The method of producing the ultraviolet ray-transparent optical glass material as claimed in claim 5, wherein the first heat-treatment step is carried out in a nitrogen gas atmosphere non-diluted or diluted with at least one inert gas other than nitrogen gas.

15. The method of producing the ultraviolet ray-transparent optical glass material as claimed in claim 5, wherein the porous silica preform body heated in the first heat-treatment step is gradually inserted into a heating zone having a temperature of 1450° C. or more but not more than 1550° C. through an inserting zone at an inserting velocity at which the porous silica preform body is gradually heated at a heating rate of 10° C./hour or more but not more than 150° C./hour.

16. The ultraviolet ray-transparent optical glass material as claimed in claim 1, suitable for a use in which ultraviolet rays having a wave length of 157 to 300 nm are irradiated to the optical glass material.

17. The ultraviolet ray-transparent optical glass material as claimed in claim 16, wherein the ultraviolet rays are emitted from an emission source selected from $F_2$ excimer laser, ArF excimer laser, KrF excimer laser, $Xe_2$ excimer laser, Xe lamp, $D_2$ lamp, low pressure Hg lamp and KrCl excimer lamp.

18. The ultraviolet ray-transparent optical glass material as claimed in claim 17, selected from tube and bulb materials for excimer lamps, metal halide lamps, mercury lamps, short arc mercury lamps $D_2$ lamps, $H_2$ lamps, and xenon lamps; TFT substrate materials for polycrystalline silicon; glass materials for radiation-resistant optical fibers; photomasking materials; and substrate materials for soft X-ray reflective mirrors.

19. The method of producing an ultraviolet ray-transparent optical glass material as claimed in claim 5, wherein the synthetic silica glass has a hydroxyl group content of 1 to 70 ppm, a chlorine content of less than 1 ppm, and a total impurity metal content of 50 ppb or less in which the contents of individual impurity metals are each less than 10 ppb.

20. The method of producing an ultraviolet ray-transparent optical glass material as clamed in claim 5 or 19, wherein the synthetic silica glass has a transmittance of ultraviolet rays having a wavelength of 172 to 200 nm of 40% or more even after the glass is exposed to an irradiation of ultraviolet rays at a wavelength of 160 to 300 nm for one hour.

21. The method of producing an ultraviolet ray-transparent optical glass material as claimed in claim 5, wherein the synthetic silica glass has a high uniformity represented by a differential refractive index $\Delta 2\times 10^{-6}$ or less determined in a circular region having a diameter $\Phi$ of 200 mm.

* * * * *